United States Patent
Nakahara et al.

(10) Patent No.: US 9,484,149 B2
(45) Date of Patent: Nov. 1, 2016

(54) RESONANCE-TYPE NON-CONTACT POWER SUPPLY SYSTEM

(71) Applicant: YAZAKI CORPORATION, Minato-ku, Tokyo (JP)

(72) Inventors: Takahiro Nakahara, Susono (JP); You Yanagida, Susono (JP); Antony Ngahu, Susono (JP)

(73) Assignee: YAZAKI CORPORATION, Tokyo (JP)

(*) Notice: Subject to any disclaimer, the term of this patent is extended or adjusted under 35 U.S.C. 154(b) by 554 days.

(21) Appl. No.: 14/044,948

(22) Filed: Oct. 3, 2013

(65) Prior Publication Data

US 2014/0042822 A1 Feb. 13, 2014

Related U.S. Application Data

(63) Continuation of application No. PCT/JP2012/060796, filed on Apr. 20, 2012.

(30) Foreign Application Priority Data

Apr. 22, 2011 (JP) ................................. 2011-096355

(51) Int. Cl.
*B60L 5/00* (2006.01)
*B60L 11/18* (2006.01)
(Continued)

(52) U.S. Cl.
CPC ............... *H01F 38/14* (2013.01); *B60L 5/005* (2013.01); *B60L 11/182* (2013.01); *H01F 27/02* (2013.01);
(Continued)

(58) Field of Classification Search
CPC B60L 5/005; B60L 11/1809; B60L 11/1811; B60L 11/1812; B60L 11/1816; B60L 11/182; B60L 11/1829; B60L 11/1831; H01F 27/02; H01F 27/022; H01F 27/34; H01F 27/346; H01F 27/36; H01F 27/362; H01F 27/365; H01F 38/14; H02J 5/00; H02J 5/005; H02J 7/025; H02J 17/00; H02J 50/00; H02J 50/10; H02J 50/12; H02J 50/70; H04B 5/0037; H04B 15/02; Y02T 10/7072; Y02T 90/10; Y02T 90/122
USPC .................... 307/91, 104; 336/84 C, 84 R
See application file for complete search history.

(56) References Cited

U.S. PATENT DOCUMENTS 5,821,731 A * 10/1998 Kuki .................. B60L 11/1805
320/108
2008/0180332 A1 7/2008 Noro et al.
(Continued)

FOREIGN PATENT DOCUMENTS

CN 2539312 Y 3/2003
JP 63228933 A 9/1988
(Continued)

OTHER PUBLICATIONS

Communication dated Jan. 20, 2015 issued by the Japanese Patent Office in counterpart Japanese Patent Application No. 2011-096355.
(Continued)

*Primary Examiner* — Levi Gannon
(74) *Attorney, Agent, or Firm* — Sughrue Mion, PLLC

(57) ABSTRACT

A resonance-type non-contact power supply system includes a power-transmission-side metal shield to cover an area around a primary coil and a primary resonance coil. A coaxial cable outer conductor of a power-transmission-side coaxial cable and the power-transmission-side metal shield are threadedly engaged using a coaxial male connector and a coaxial female connector.

4 Claims, 12 Drawing Sheets

(51) Int. Cl.

| | | |
|---|---|---|
| *H01F 27/02* | (2006.01) | |
| *H01F 27/36* | (2006.01) | |
| *H01F 38/14* | (2006.01) | |
| *H02J 5/00* | (2016.01) | |
| *H02J 7/02* | (2016.01) | |
| *H04B 5/00* | (2006.01) | |
| *H02J 17/00* | (2006.01) | |

(52) U.S. Cl.
CPC ............ *H01F 27/362* (2013.01); *H02J 5/005* (2013.01); *H02J 7/025* (2013.01); *H02J 17/00* (2013.01); *H02J 50/12* (2016.02); *H04B 5/0037* (2013.01); *Y02T 10/7005* (2013.01); *Y02T 10/7072* (2013.01); *Y02T 90/122* (2013.01); *Y02T 90/14* (2013.01)

(56) References Cited

U.S. PATENT DOCUMENTS

| | | | |
|---|---|---|---|
| 2010/0065352 A1 | 3/2010 | Ichikawa | |
| 2010/0181841 A1* | 7/2010 | Azancot | H01F 38/14 307/104 |
| 2011/0004090 A1 | 1/2011 | Keightley et al. | |
| 2011/0148351 A1 | 6/2011 | Ichikawa | |
| 2011/0254376 A1* | 10/2011 | Sasaki | B60L 5/005 307/104 |
| 2011/0259694 A1 | 10/2011 | Matsumura | |
| 2012/0242447 A1* | 9/2012 | Ichikawa | B60L 11/182 336/84 C |
| 2012/0306262 A1* | 12/2012 | Taguchi | B60L 3/00 307/9.1 |
| 2013/0038135 A1* | 2/2013 | Ichikawa | B60L 11/182 307/104 |
| 2013/0127242 A1* | 5/2013 | Ichikawa | B60L 11/182 307/9.1 |

FOREIGN PATENT DOCUMENTS

| | | |
|---|---|---|
| JP | 5344602 A | 12/1993 |
| JP | 2002002335 A | 1/2002 |
| JP | 2007-252027 A | 9/2007 |
| JP | 2008182523 A | 8/2008 |
| JP | 2009501510 A | 1/2009 |
| JP | 201040699 A | 2/2010 |
| JP | 201070048 A | 4/2010 |
| JP | 2011-45189 A | 3/2011 |
| JP | 2011510735 A | 4/2011 |
| WO | 2010103639 A1 | 9/2010 |

OTHER PUBLICATIONS

Communication issued on Mar. 4, 2015 by The State Intellectual Property Office of the PR China in related application No. 201280019294.1.

Communication issued on May 1, 2015 by the Korean Intellectual Property Office in related Application No. 1020137027838.

Office Action dated Aug. 31, 2015, issued by the State Intellectual Property Office of P.R. China in counterpart Chinese Application No. 201280019294.1.

Communication dated Feb. 24, 2015 issued by the European Patent Office in counterpart European Patent Application No. 12773561.1.

Office Action dated Nov. 3, 2014, issued by the Korean Intellectual Property Office in counterpart Korean Application No. 10-2013-7027838.

Translation of Written Opinion, filed on Oct. 3, 2013, dated Jun. 26, 2012, issued by the International Searching Authority, in counterpart Application No. PCT/JP2012/060796.

International Search Report (PCT/ISA/210) dated Jun. 26, 2012 in International Application No. PCT/JP2012/060796.

Written Opinion (PCT/ISA/237) dated Jun. 26, 2012 in International Application No. PCT/JP2012/060796.

* cited by examiner

US 9,484,149 B2

RESONANCE-TYPE NON-CONTACT POWER SUPPLY SYSTEM

CROSS REFERENCE TO RELATED APPLICATIONS

This application is a continuation of PCT application No. PCT/JP2012/060796, which was filed on Apr. 20, 2012 based on Japanese Patent Application (No. 2011-096355) filed on Apr. 22, 2011, the contents of which are incorporated herein by reference. Also, all the references cited herein are incorporated as a whole.

TECHNICAL FIELD

The present invention relates to a resonance-type non-contact power supply system.

BACKGROUND ART

A technique in which electric power is supplied to a load device by a non-contact system is known. As a product into which the technique is applied, a mobile phone charging system has become popular in general. Furthermore, in recent years, the non-contact power supply system is practically used even as a power supply system for electric vehicles, and various standards are established in view of practical operations.

There are various types of non-contact power supply system. A power supply system for electric vehicles is a resonance-type non-contact power supply system, which is shown in FIG. 1, which greatly attracts attentions and whose basic principle is developed and demonstrated by MIT (Massachusetts Institute of Technology) (for example, refer to JP-A-2009-501510). The resonance-type non-contact power supply system shown in the figure includes a resonance system of a high frequency power supply, resonance coils (primary and secondary resonance coils) and a load that transmits electric power non-contactly. Specifically, power-transmission-side (primary side) devices include a high frequency power supply, a primary coil, and a primary resonance coil. Power-receiving-side (secondary device) devices include a secondary resonance coil, a secondary coil and a load. The power-transmission-side devices and the power-receiving-side devices in the system have an advantage of being able to supply electric power to a place spaced several meters with a high transmission efficiency (sometimes around 50%) by being magnetically coupled (electromagnetically coupled)) by resonance.

In the technique of MIT shown in FIG. 1, the resonance system is assumed to be configured with "a power supply part (the high frequency power supply and the primary coil), a resonance part (the primary resonance coil and the secondary resonance coil), and a load part" (the secondary coil and the load). However, additional components become necessary when the non-contact power supply system is mounted in an electronic device or an automobile power supply system. A system configuration example where the system of FIG. 1 is mounted in a real system is shown in FIG. 2. As shown in the figure, in the real system, a transmission path between the power supply and a primary resonance coil part and a transmission path between a secondary resonance coil part and the load are necessary. When parallel lines are assumed as the transmission path, because variation of the characteristic impedance is large and transmission loss is large, the non-contact power supply system is applicable substantially only to a small-scale system.

For example, in the electromagnetic induction method, the above problem is partly solved by a technique using Litz wires (refer to JP-A-2010-40699 and JP-A-5-344602).

According to the technique using Litz wires disclosed in JP-A-2010-40699 and JP-A-5-344602, there is a problem that the variation of the characteristic impedance cannot be reduced although the transmission loss can be reduced. Therefore, in the frequency band (several MHz to several 10 MHz) used in the resonance method, there are few improvement effects. As a result, a coaxial cable for which the variation of the characteristic impedance is small, and the transmission efficiency is high is often used for the transmission path (transmission line) of a large-scale system such as the system used for charging vehicles. However, as shown in FIG. 3, when coaxial cables are used in a system in which the resonance method is used, there are the following problems.

(1) When a coaxial cable is used for the transmission path, an electric current flows through not only the inner side but also the outer side of a coaxial cable outer conductor 64 of the primary coaxial cable (the power-transmission-side coaxial cable 60), and a radiated electromagnetic field occurs.

(2) Because part of the electromagnetic field from a primary coil 30 is coupled with the coaxial cable outer conductor 64 and an induced current flows, a radiated electromagnetic field occurs.

(3) Because all of the electromagnetic field from a secondary resonance coil 45 is not necessarily coupled with a secondary coil 40, part of the electromagnetic field is coupled with a coaxial cable outer conductor 74 of a power-receiving-side coaxial cable 70, and an induced current flows, a radiated electromagnetic field occurs.

When these problems are addressed from the viewpoint of transmission efficiency, because of the idealized model in FIG. 1, it is assumed that all the electromagnetic energy is supplied to the load, but part of the electromagnetic energy is lost in the constructions of FIGS. 2 and 3.

A technique is considered to cover the whole system with shields 99 as a general measure, as shown in FIG. 4. However, the induced current that is the cause of the transmission loss cannot be prevented from occurring by this technique. Further, there are the following problems: power supply operations are disturbed, the weight of the overall system increases, and the system is difficult to be mounted. Because particularly when the system is mounted to a vehicle or the like, the energy consumption efficiency drops remarkably with the weight increase of the vehicle, another more practical technique is demanded.

SUMMARY OF THE INVENTION

An exemplary embodiment of the invention is made in view of these situations, and the object of the exemplary embodiment is to provide a technique to solve the above problems.

According to an aspect of the exemplary embodiment, there is provided a resonance-type non-contact power supply system which includes a power-transmission-side resonance coil part and a power-receiving-side resonance coil part, and which transmits electric power by a non-contact resonance effect from the power-transmission-side resonance coil part to the power-receiving-side resonance coil part, the system further including: a first coaxial cable which electrically connects a high frequency power supply and the power-transmission-side resonance coil, and a power-transmission-side shield part which is a good conductor and covers from outside to accommodate the power-transmission-side resonance coil part, and which is electrically connected to a housing of the high frequency power supply by an outer conductor of the first coaxial cable, wherein a size of the power-transmission-side shield part is set so that the electromagnetic coupling of the power-transmission-side resonance coil part is not affected, the power-transmission-side shield part accommodates the power-transmission-side resonance coil part not to protrude from the power-transmission-side shield part, and a first transmission opening is provided on a bottom of the power-transmission-side shield part and the outer conductor of the first coaxial cable is connected to an inner edge of the first transmission opening.

Further, the system may further include a second coaxial cable which electrically connects the power-receiving-side resonance coil part and a load device, and a power-receiving-side shield part which is a good conductor and covers from outside to accommodate the power-receiving-side resonance coil part, and which is electrically connected to a housing of the load device by an outer conductor of the second coaxial cable, and wherein a size of the power-receiving-side shield may be set so that the electromagnetic coupling of the power-receiving-side resonance coil part is not affected, the power-receiving-side shield part may accommodate the power-receiving-side resonance coil part not to protrude from the power-receiving-side shield part, and a second transmission opening is provided on a bottom of the power-receiving-side shield part and the outer conductor of the second coaxial cable is connected to an inner edge of the second transmission opening.

The power-transmission-side shield part may include a first cover body which has such a material and such a construction that the electromagnetic coupling is not affected at the power-receiving-side resonance coil part side.

The power-receiving-side shield part may include a second cover body which has such a material and such a construction that the electromagnetic coupling is not affected at the power-transmission-side resonance coil part side.

According to another aspect of the exemplary embodiment, there is provided a resonance-type non-contact power supply system which includes a power-transmission-side resonance coil part and a power-receiving-side resonance coil part, and which transmits electric power by a non-contact resonance effect from the power-transmission-side resonance coil part to the power-receiving-side resonance coil part, further including: a second coaxial cable which electrically connects the power-receiving-side resonance coil part and a load device; and a power-receiving-side shield part which is a good conductor and covers from outside to accommodate the power-receiving-side resonance coil part, and which is electrically connected to a housing of the load device by an outer conductor of the second coaxial cable, and wherein a size of the power-receiving-side shield is set so that the electromagnetic coupling of the power-receiving-side resonance coil part is not affected, the power-receiving-side shield part accommodates the power-receiving-side resonance coil part not to protrude from the power-receiving-side shield part, and a second transmission opening is provided on a bottom of the power-receiving-side shield part and the outer conductor of the second coaxial cable is connected to an inner edge of the second transmission opening.

Further, the power-receiving-side shield part may include a second cover body which has such a material and such a construction that the electromagnetic coupling is not affected at the power-transmission-side resonance coil part side.

According to the exemplary embodiment, a technique to prevent the transmission efficiency from dropping and reduce the unnecessary radiated electromagnetic fields in the resonance-type non-contact power supply system can be provided.

DETAILED DESCRIPTION OF THE EXEMPLARY EMBODIMENTS

Below, modes for carrying out the invention (hereinafter referred to as "embodiments") are explained with reference to the figures. An outline of the present embodiment is as follows. In the resonance-type non-contact power supply system of the present embodiment, areas around a primary and a secondary resonance coil parts are covered with metal cases (metal shields), and the metal cases are electrically connected with the outer conductors of coaxial line cables. With the above construction, the transmission efficiency can be improved and the radiated electromagnetic field can be reduced in a simple and low cost way. By placing the metal cases only around the resonance coil parts, the weight can be less than that when the whole system is shielded. Thereby, even if the system is carried on a mobile body such as a vehicle, the increase of the energy consumption due to the weight increase can be inhibited. The details are described as follows.

Figure 1:
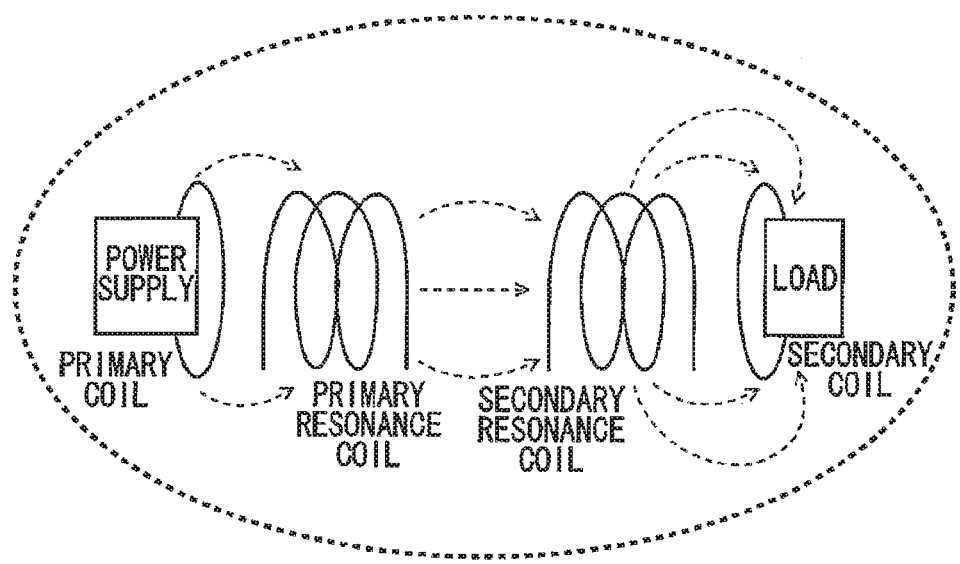
FIG. 1 is a figure to describe the basic principle of a resonance-type non-contact power supply system of the related art.
Figure 2:
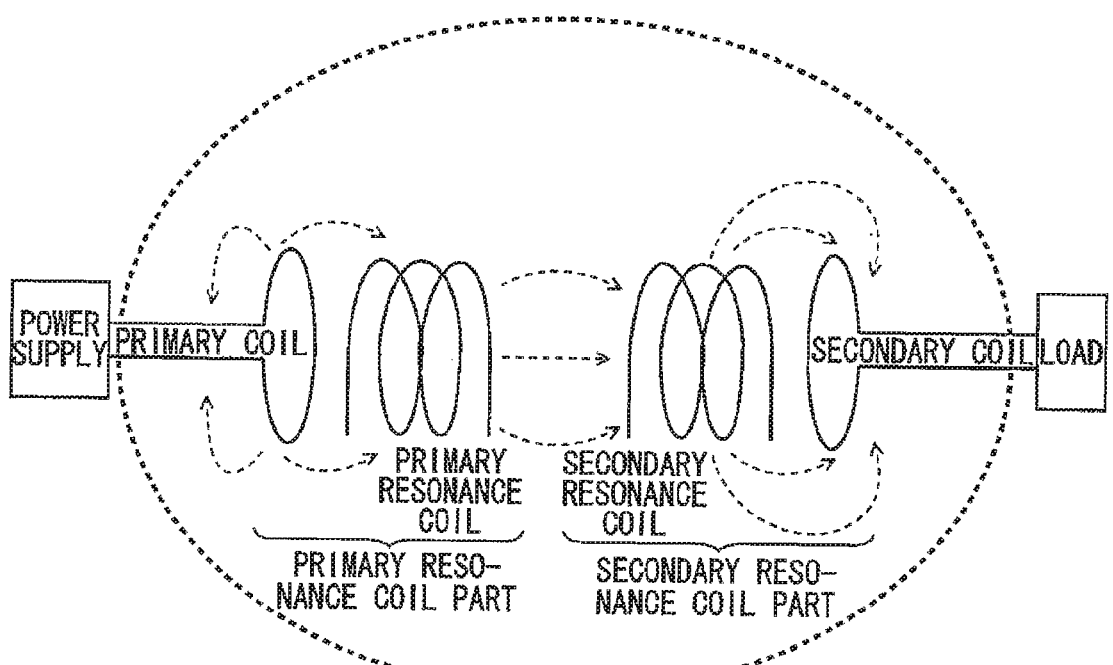
FIG. 2 is a figure which schematically shows the construction of the resonance-type non-contact power supply system of FIG. 1 of the related art when the resonance-type non-contact power supply system is mounted in a real system.
Figure 3:
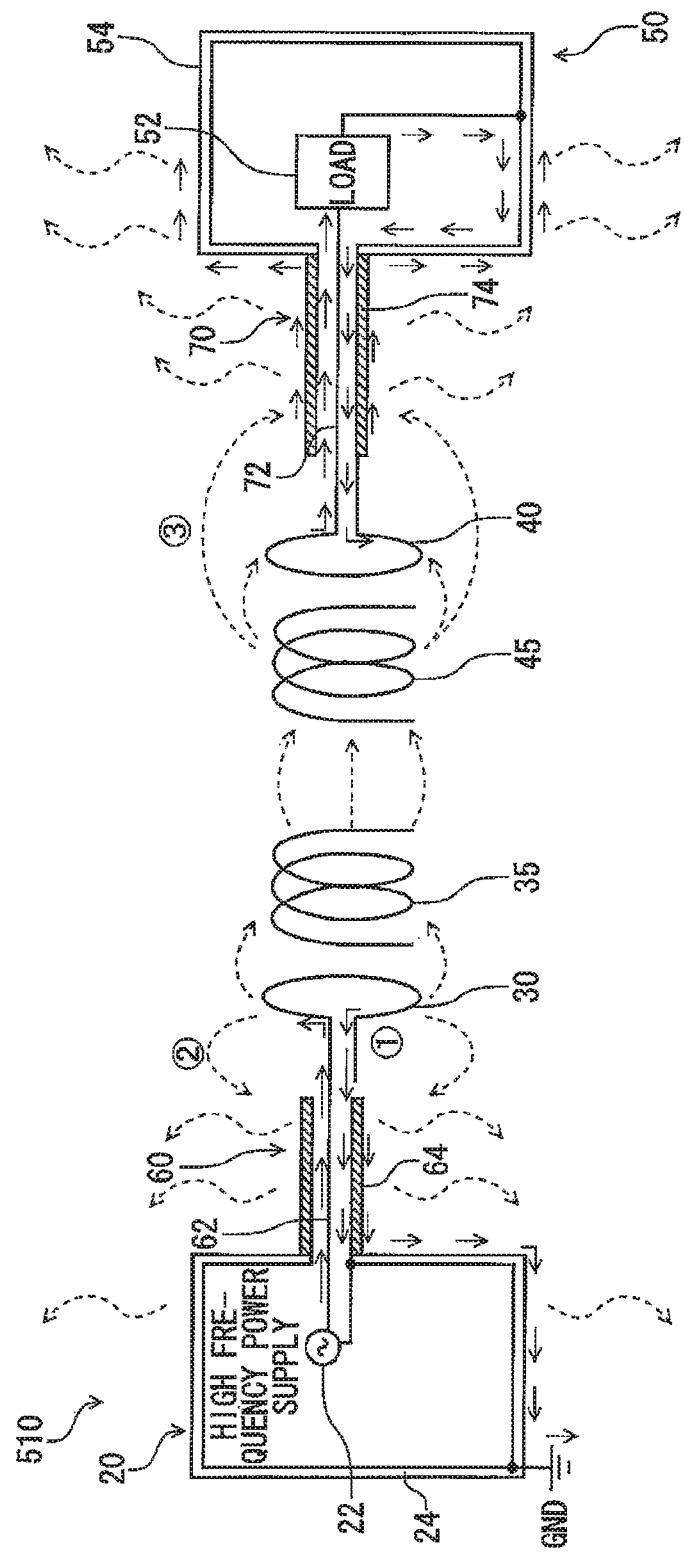
FIG. 3 is a figure to describe that unnecessary radiated electromagnetic fields occur in the resonance-type non-contact power supply system of the related art.
Figure 4:
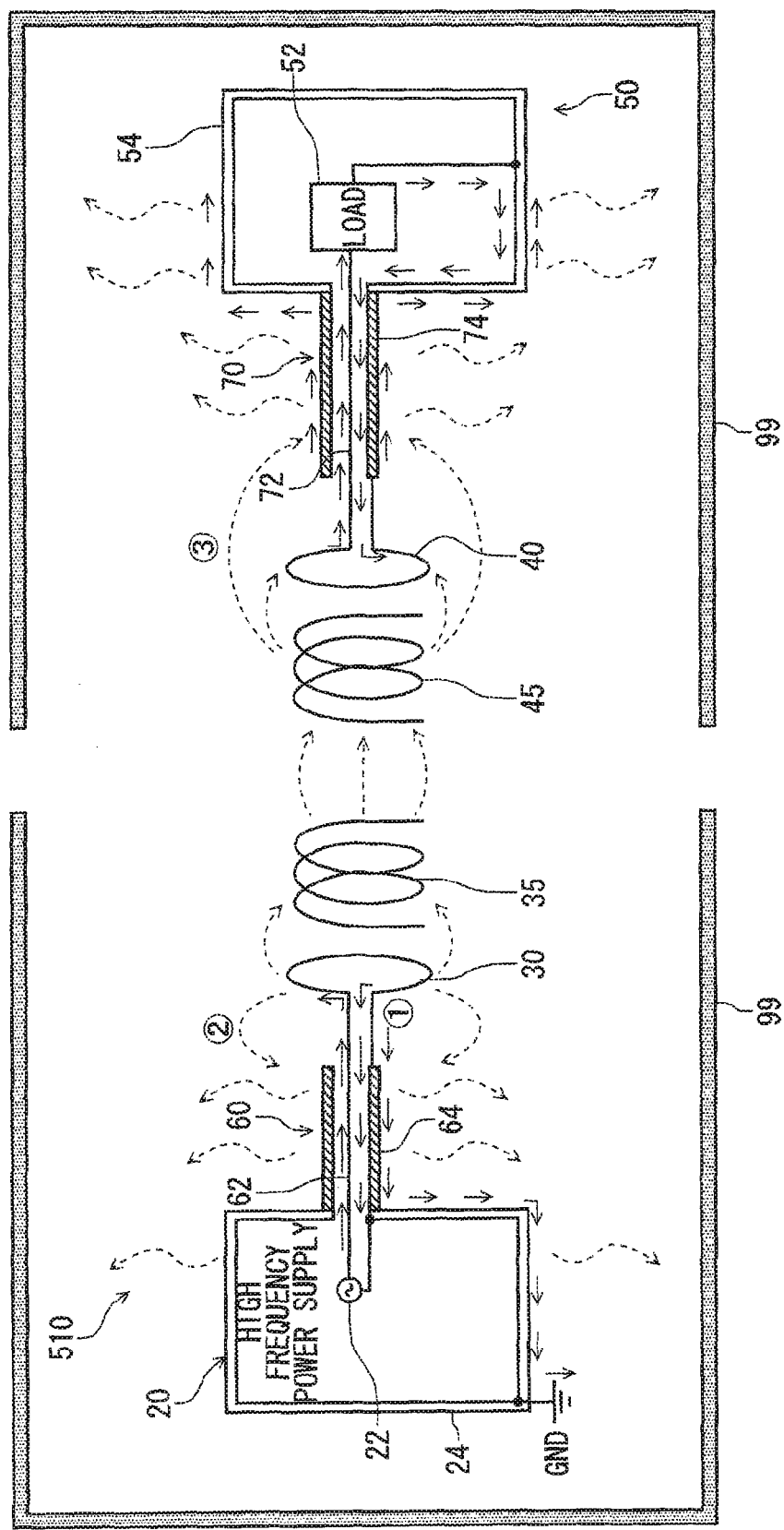
FIG. 4 is a figure which shows that the whole resonance-type non-contact power supply system of the related art is covered with shields.
Figure 5:
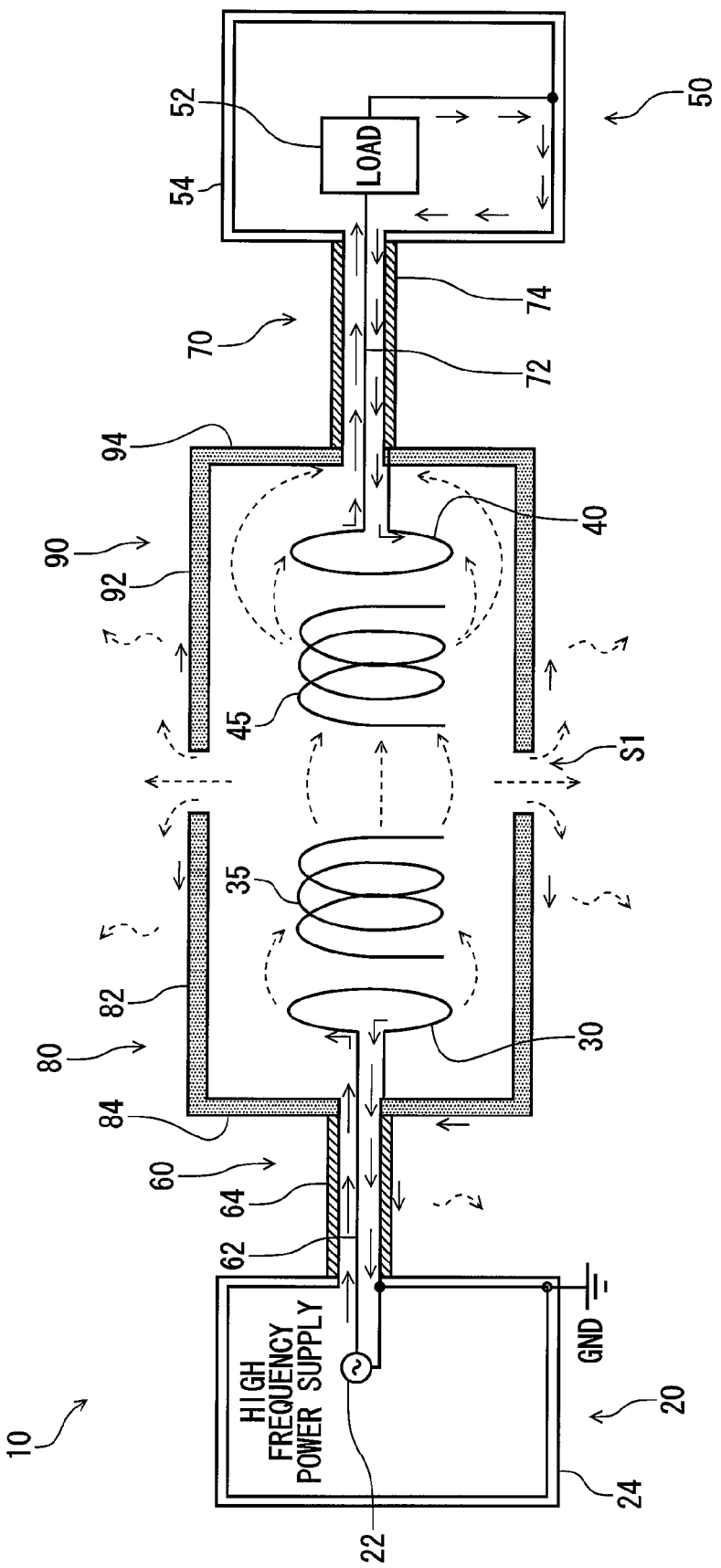
FIG. 5 is a schematic block diagram which shows the construction of a resonance-type non-contact power supply system of an embodiment of the invention.

FIG. 5 is a figure which schematically shows a construction of a resonance-type non-contact power supply system 10 of the present embodiment. The resonance-type non-contact power supply system 10 is different from the resonance-type non-contact power supply system 510 of FIG. 3 or FIG. 4 in that a power-transmission-side metal shield (metal case) 80 and a power-receiving-side metal shield (metal case) 90 are provided. Other components are the same, and some of the same components are given the same symbols. Because the technique disclosed in the JP-A-2009-501510 can be used to explain the electric power transmission principle of the resonance-type non-contact power supply system, the detailed description is omitted here.

The resonance-type non-contact power supply system 10 includes a high frequency power supply 20, a primary coil 30 and a primary resonance coil 35 as power-transmission-side (primary side) devices. The primary coil 30 is connected to the high frequency power supply 20 by using a power-transmission-side coaxial cable 60. More specifically, the high frequency power supply 20 includes an oscillation source 22 inside a power supply housing 24, and is connected to the primary coil 30 by the power-transmission-side coaxial cable 60. The power supply housing 24 is grounded to a ground GND. To ground the power supply housing 24, an exclusive ground line may be used, or FG (Frame Ground) lines of AC cables or the like may be used. It is described that the system 10 includes the high frequency power supply 20, but the system may be constructed without the high frequency power supply 20. In this case, the system 10 may be so constructed that a suitable high frequency power supply outside the system 10 is connectable and electric power from the high frequency power supply may be received.

The resonance-type non-contact power supply system 10 includes the power-transmission-side metal shield 80 to cover the area around the primary coil 30 and the primary resonance coil 35. Detailed structures are described in FIGS. 6A to 9, but the power-transmission-side metal shield 80, for example, has an opening towards the power-receiving-side (secondary side; right side in the figure), has a cylindrical tube-like or cubical shape, and is made of metal of a good conductor) such as steel or copper. That is, a shield side 82 of the power-transmission-side metal shield 80 completely covers the area around the primary coil 30 and the primary resonance coil 35 except the opening. The power-transmission-side metal shield 80 is not limited to the cylindrical shape, but may have any shapes that function as a shield case. The material of the power-transmission-side metal shield 80 may be suitably chosen as long as the power-transmission-side metal shield 80 is a conductor.

A shield bottom 84 of the power-transmission-side metal shield 80 is provided with a transmission opening for the transmission path between the high frequency power supply 20 and the primary coil 30, and the power-transmission-side coaxial cable 60 is connected to the transmission opening. More specifically, one end (at the right side in the figure) of a coaxial cable outer conductor 64 of the power-transmission-side coaxial cable 60 is connected to the shield bottom 84 of the power-transmission-side metal shield 80. The other end (at the left side in the figure) of the coaxial cable outer conductor 64 is connected to the power supply housing 24 of the high frequency power supply 20. A coaxial cable inner conductor 62 directly connects the oscillation source 22 of the high frequency power supply 20 and the primary coil 30.

On the other hand, the resonance-type non-contact power supply system 10 includes a load device 50, a secondary coil 40 and a secondary resonance coil 45 as power-receiving-side (secondary side) devices. A load 52 such as batteries is provided inside a load housing 54 of the load device 50. The load device 50 and the secondary coil 40 are connected by a power-receiving-side coaxial cable 70. It is described that the system 10 includes the load device 50, but the system may be constructed without the load device 50. In this case, the system 10 may be so constructed that a suitable load device outside the system 10 is connectable and electric power can be supplied to the load device.

The resonance-type non-contact power supply system 10 includes a power-receiving-side metal shield 90, like the power-transmission-side metal shield 80 at the power transmission side, to cover the secondary coil 40 and the secondary resonance coil 45. More specifically, the power-receiving-side metal shield 90, for example, has an opening towards the power transmission side (primary side; left side in the figure), has a cylindrical tube-like or cubical shape, and is made of metal of a good conductor such as steel or copper. That is, a shield side 92 of the power-receiving-side metal shield 90 completely covers the area around the secondary coil 40 and the secondary resonance coil 45 except the opening. The power-receiving-side metal shield 90 is not limited to the cylindrical or cubical shape, but may have any shapes that function as a shield case. The material of the power-receiving-side metal shield 90 may be suitably chosen as long as the power-receiving-side metal shield 90 is a conductor.

A shield bottom 94 of the power-receiving-side metal shield 90 is provided with a transmission opening for the transmission path between the load device 50 and the secondary coil 40, and the power-receiving-side coaxial cable 70 is connected to the transmission opening. More specifically, one end (at the left side in the figure) of a coaxial cable outer conductor 74 of the power-receiving-side coaxial cable 70 is connected to the shield bottom 94 of the power-receiving-side metal shield 90. The other end (at the right side in the figure) of the coaxial cable outer conductor 74 is connected to the load housing 54 of the load device 50. A coaxial cable inner conductor 72 is directly connected to the load 52 in the load housing 54.

Next, the power-transmission-side metal shield 80 is described with reference to FIGS. 6A to 9 in detail. The power-receiving-side metal shield 90 has a similar construction, and the description is omitted.

Figure 6A:
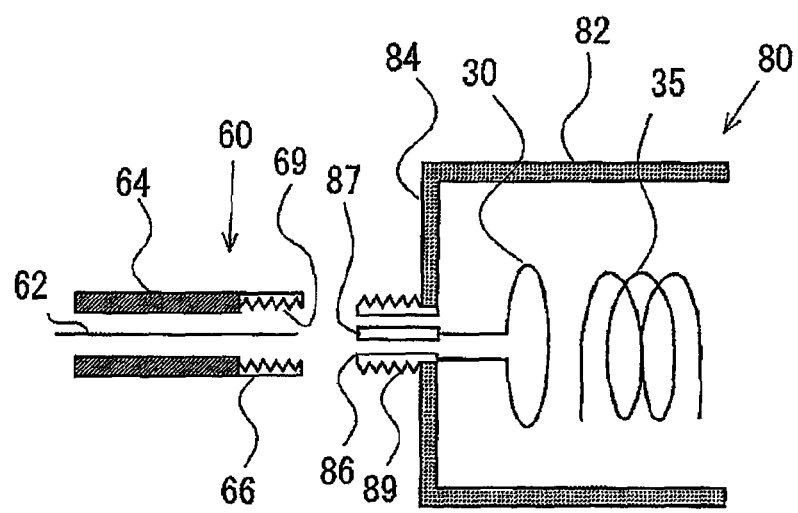
FIGS. 6A and 6B are schematic block diagrams which show constructions of power-transmission-side and power-receiving-side metal shields of the embodiment of the invention focused on connectors.
Figure 6B:
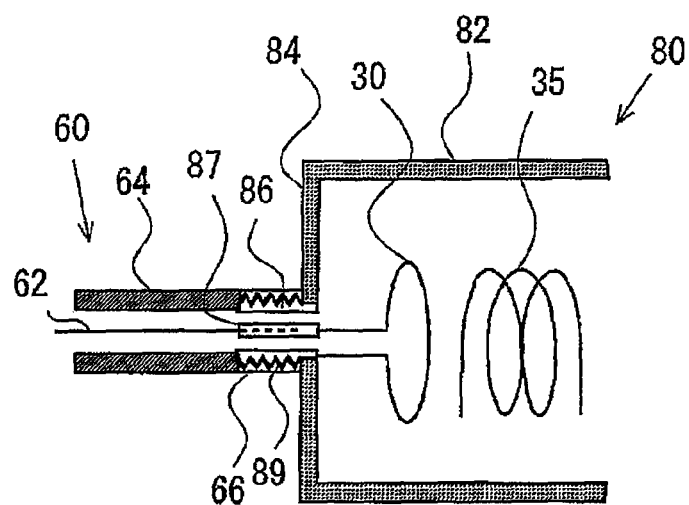

As shown in FIGS. 6A and 6B, the power-transmission-side metal shield 80 and the power-transmission-side coaxial cable 60 are connected by connectors. Specifically, the shield bottom 84 of the power-transmission-side metal shield 80 is provided with a coaxial female connector 86 to connect with the power-transmission-side coaxial cable 60. A socket 87 at the central side of the coaxial female connector 86 is connected to one end of the primary coil 30.

A periphery threaded part 89 of the coaxial female connector 86 is connected to the other end of the primary coil 30.

The power-transmission-side coaxial cable 60 is provided with a coaxial male connector 66 to threadedly engage with the coaxial female connector 86. The outer peripheral portion of the coaxial male connector 66 is connected with the coaxial cable outer conductor 64, and the inner surface side of the coaxial male connector 66 is screw processed to become an inner periphery threaded part 69, and threadedly engage with the coaxial female connector 86. As shown in FIG. 6B, when the coaxial female connector 86 and the coaxial male connector 66 threadedly engage, the distal end of the coaxial cable inner conductor 62 is inserted into the socket 87 of the coaxial female connector 86 and electrically connected. When the inner periphery threaded part 69 and the periphery threaded part 89 threadedly engage, the power-transmission-side metal shield 80 and the coaxial cable outer conductor 64 are electrically connected at the outer side. Thereby, the transmission path from the oscillation source 22 to the primary coil 30 is formed. The transmission path to connect the secondary coil 40 and the load 52 is formed with a similar construction.

Figure 7:
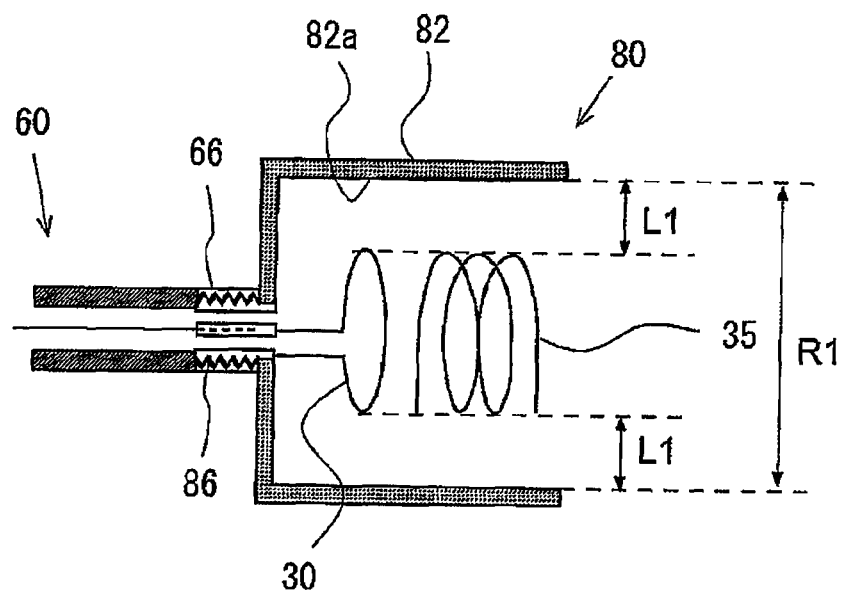
FIG. 7 is a schematic block diagram which shows the construction of the power-transmission-side and power-receiving-side metal shields of the embodiment of the invention, which are focused on an arrangement of a resonance coil part.

As shown in FIG. 7, the size of the power-transmission-side metal shield 80 (inner diameter R1) is set so that while the primary coil 30 and the primary resonance coil 35 are accommodated inside, a distance L1 from the primary coil 30 and the primary resonance coil 35 to an inner surface 82a of the shield side 82 does not affect the electromagnetic coupling of the primary side and the secondary side. There may be only air in the space corresponding to this distance L1, or material narrowing the electromagnetic coupling area may be inserted into the space.

Figure 8:
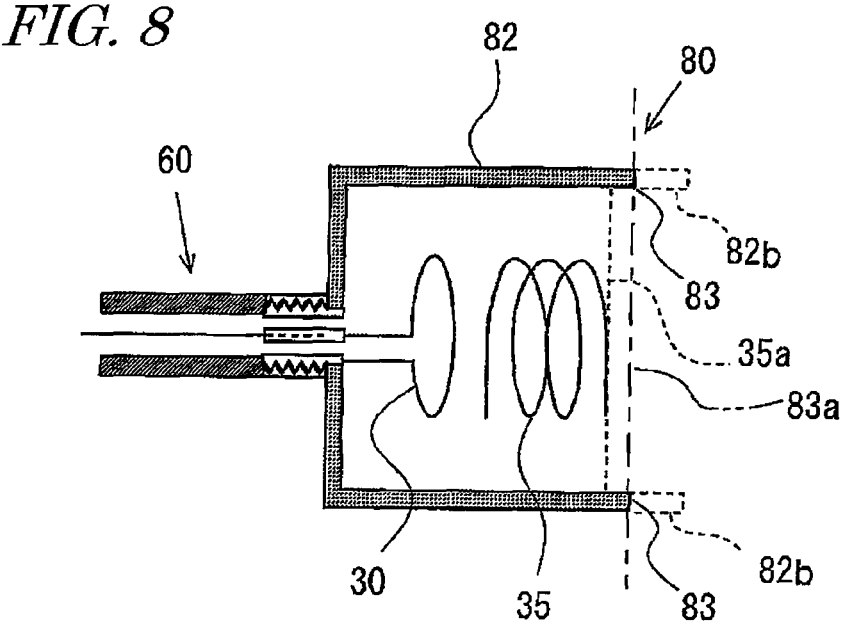
FIG. 8 is a schematic block diagram which shows the construction of the power-transmission-side and power-receiving-side metal shields of the embodiment of the invention on the arrangement of the resonance coil part.

As shown in FIG. 8, the primary coil 30 and the primary resonance coil 35 are completely accommodated inside the power-transmission-side metal shield 80. That is, a position 35a of the primary resonance coil 35 which is closest to the secondary side should be at the inner side (left side in the figure) of a front end portion 83 of the shield side 82. Therefore, the front end portion 83 of the shield side 82 may be extended as shown with broken line parts 82b in the figure. With such a construction, the electromagnetic field that leaks from a space S1 between the power-transmission-side metal shield 80 and the power-receiving-side metal shield 90 can be significantly reduced.

Figure 9:
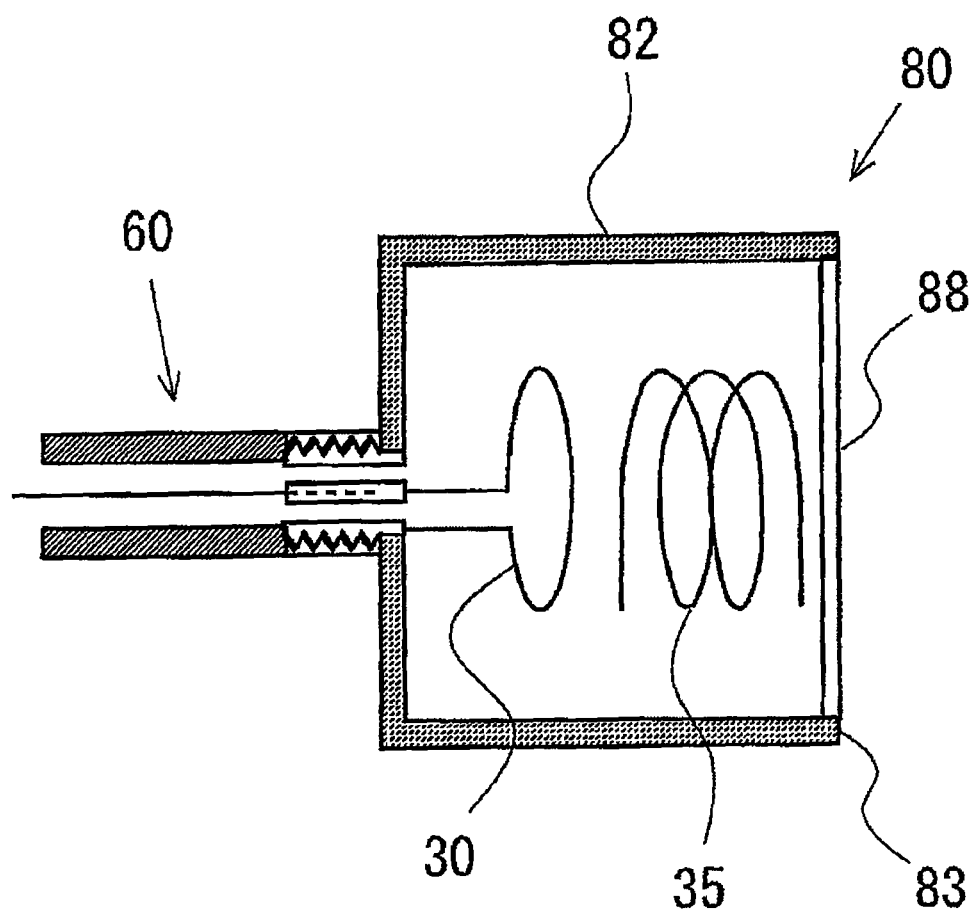
FIG. 9 is a schematic block diagram which shows the construction of the power-transmission-side and power-receiving-side metal shields of the embodiment of the invention which have a cover body.

As shown in FIG. 9, the secondary side opening portion (front end portion 83) of the power-transmission-side metal shield 80 may be covered with a cover body 88. For example, the cover body 88 is formed of, for example, resin which does not affect the electromagnetic coupling. By providing the cover body 88, physical access to the primary resonance coil 35 or the like is limited, and operations specified with standards or the like become easy.

In the resonance-type non-contact power supply system 10 having the above-mentioned construction, while the transmission path from the oscillation source 22 to the primary coil 30 and the transmission path from the load 52 to the secondary coil 40 are formed, the oscillation source 22 oscillates at a high frequency of, for example, several MHz to several 10 MHz, and the oscillation output is supplied to the primary coil 30. The primary resonance coil 35 amplifies the electric power of the primary coil 30, and produces an electromagnetic field towards the secondary resonance coil 45. The secondary resonance coil 45 is coupled with the electromagnetic field that is produced by the primary resonance coil 35, and produces an induced current to the secondary coil 40. As a result, the electric power is supplied to the load 52.

At this time, because, at the power transmission side of the above described related-art resonance-type non-contact power supply system 510, an induced current flows to the ground GND through not only the inner side but also the outer side of the coaxial cable outer conductor 64 of the power-transmission-side coaxial cable 60, a radiated electromagnetic field occurs around the power-transmission-side coaxial cable 60. Because, at the power receiving side of the resonance-type non-contact power supply system 510, all of the electromagnetic field from the secondary resonance coil 45 is not coupled with the secondary coil 40, part of the electromagnetic field is coupled with the coaxial cable outer conductor 74, and an induced current, which becomes a transmission loss, occurs, a radiated electromagnetic field occurs around the power-receiving-side coaxial cable 70 as a result.

However, in the present embodiment, collection of transmission energy inside the power-transmission-side coaxial cable 60 and the power-receiving-side coaxial cable 70 is improved. That is, because the area around the power-transmission-side (primary side) resonance part (the primary coil 30 and the primary resonance coil 35) is covered by the power-transmission-side metal shield 80, and the power-transmission-side metal shield 80 and the coaxial cable outer conductor 64 of the power-transmission-side coaxial cable 60 are electrically connected, the electric current which flows out to the outside of the coaxial cable outer conductor 64 at the power transmission side can be collected inwards. Although the electromagnetic field may leak out from the space S1 between the power-transmission-side metal shield 80 and the power-receiving-side metal shield 90 to the outside, the electromagnetic field can be significantly reduced as compared to before. Therefore, the radiated electromagnetic field occurring around the power-transmission-side coaxial cable 60 or the power-receiving-side coaxial cable 70 becomes very weak. Similarly, because the area around the power-receiving-side (primary side) resonance part (the secondary coil 40 and the secondary resonance coil 45) is covered by the power-receiving-side metal shield 90, and the power-receiving-side metal shield 90 and the coaxial cable outer conductor 74 of the power-receiving-side coaxial cable 70 are electrically connected, the electric current which flows out to the outside of the coaxial cable outer conductor 74 at the power receiving side can be collected inwards. As a result, the transmission efficiency can be improved, and the radiated electromagnetic field can be reduced. Because, in a simple and low-cost way, the transmission efficiency can be improved, and the radiated electromagnetic field can be reduced, the resonance-type non-contact power supply system 10 is suitable for being carried in, for example, a vehicle (electric vehicle) which is a mobile object.

Figure 10:
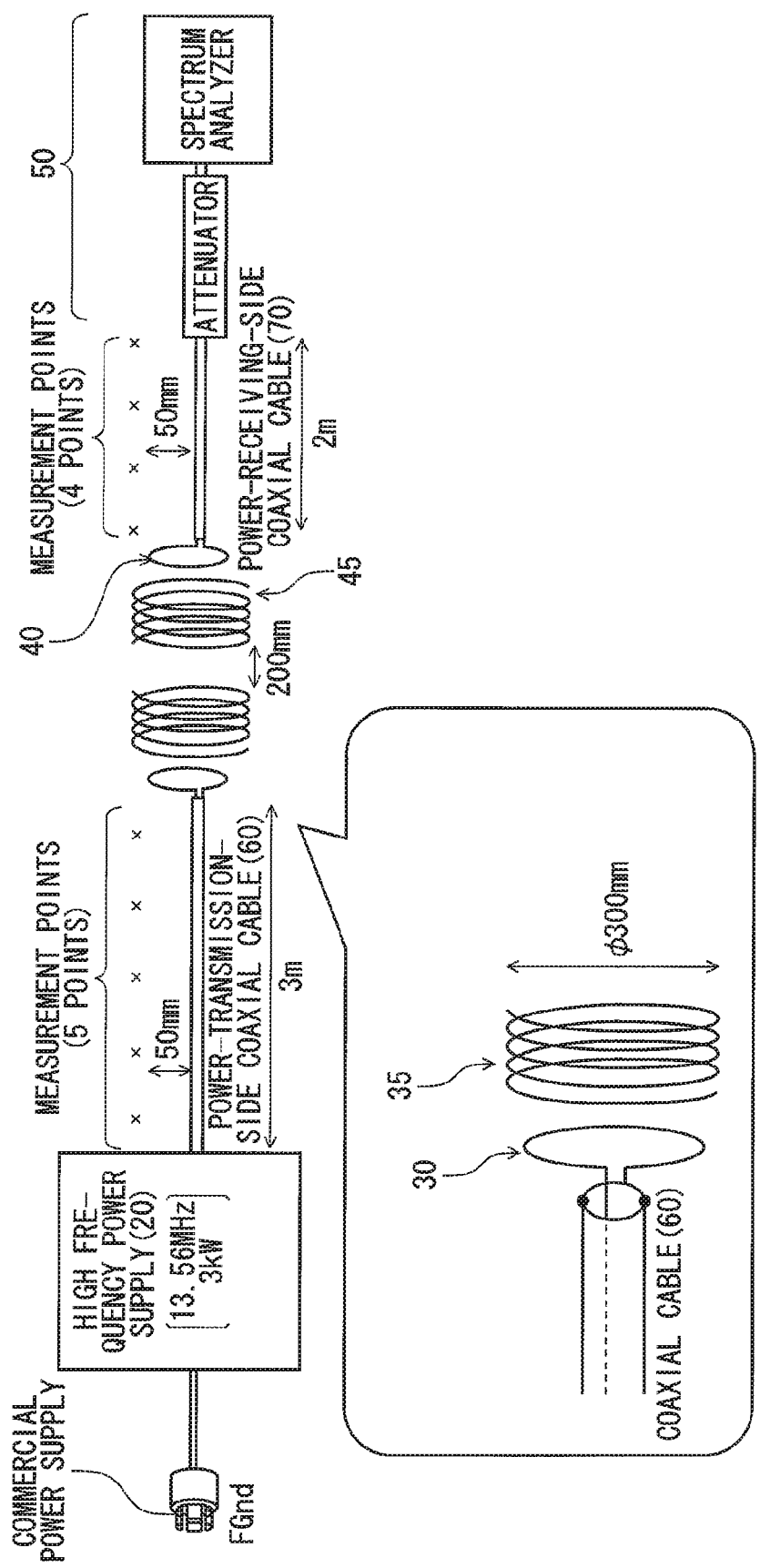
FIG. 10 is a figure which shows the construction of a system of measuring the electromagnetic field strength in the related-art resonance-type non-contact power supply system that is a comparative example, according to the embodiment of the invention.
Figure 11:
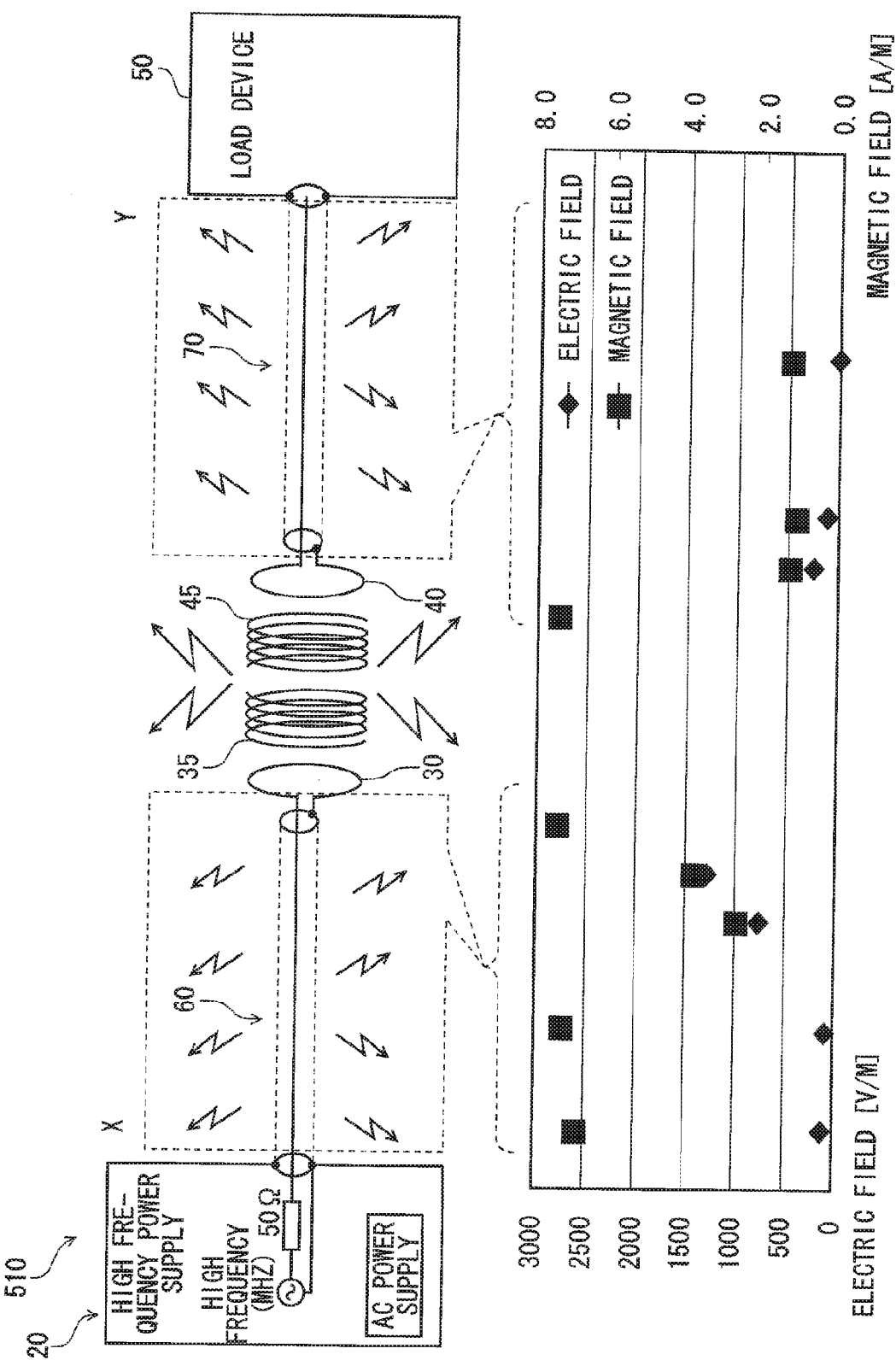
FIG. 11 is a figure which shows measurement data of the electromagnetic field strength in the related-art resonance-type non-contact power supply system that is the comparative example, according to the embodiment of the invention.
Figure 12:
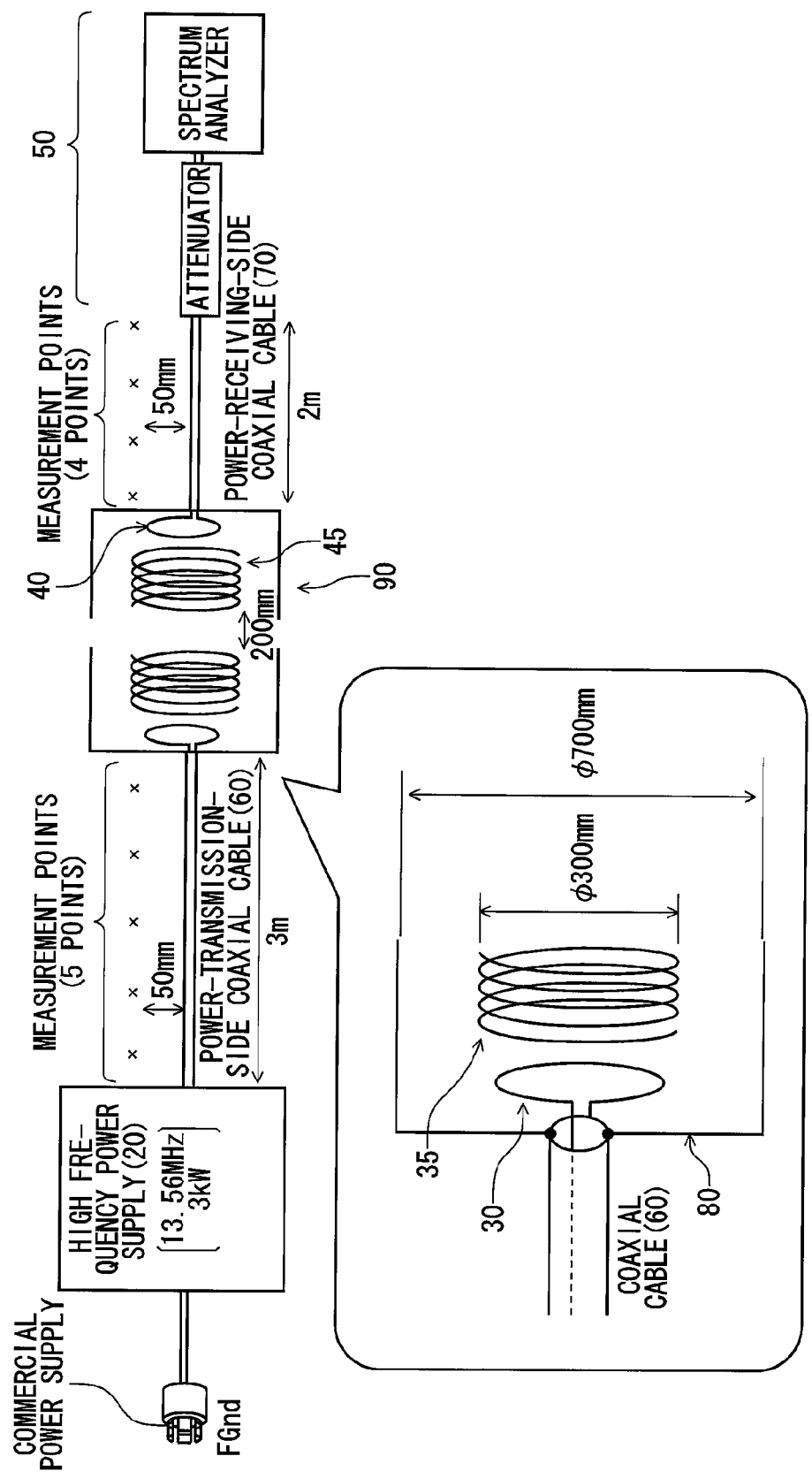
FIG. 12 is a figure which shows the construction of a system of measuring the electromagnetic field strength in the resonance-type non-contact power supply system, according to the embodiment of the invention.
Figure 13:
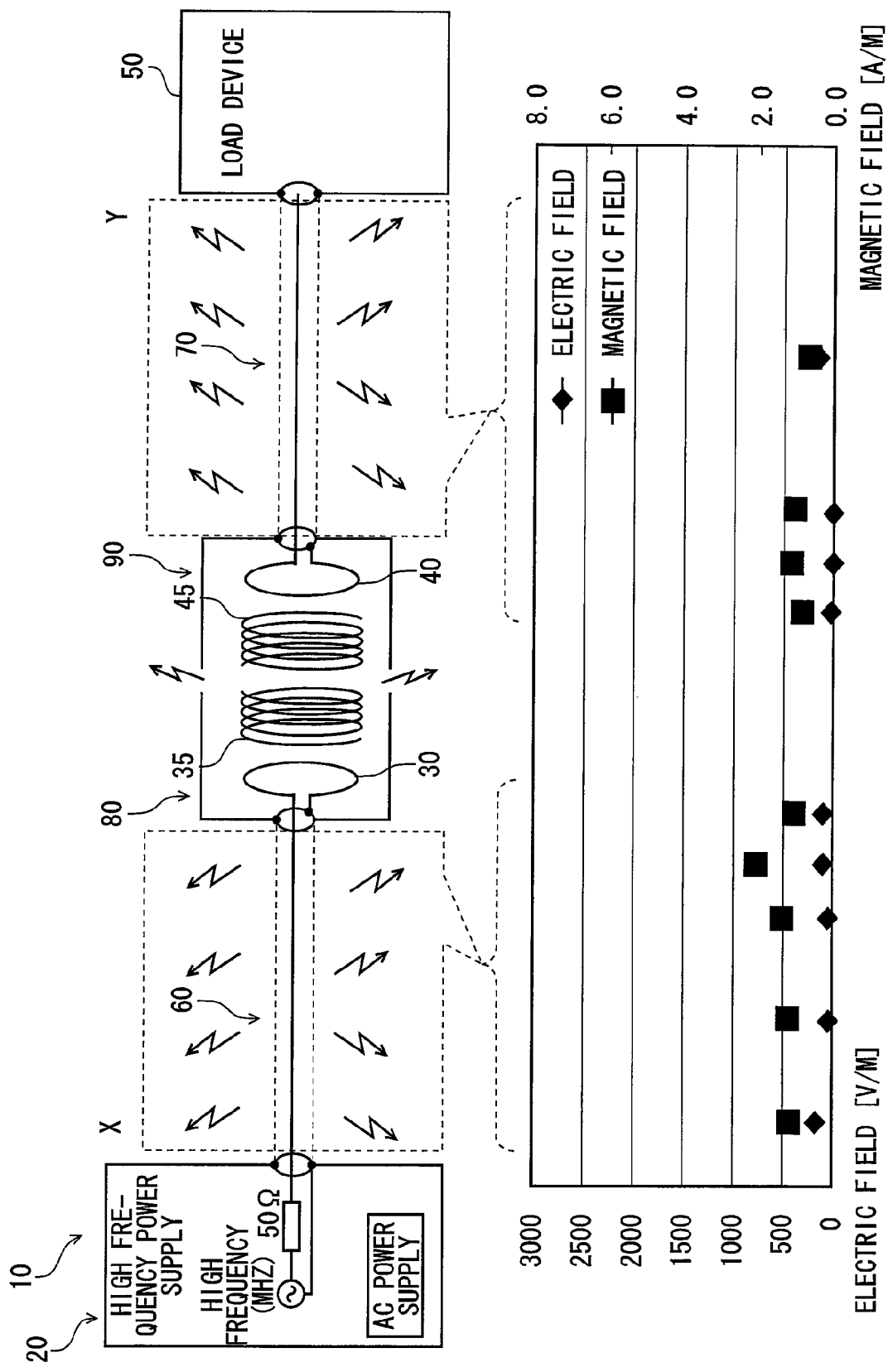
FIG. 13 is a figure which shows measurement data of the electromagnetic field strength in the resonance-type non-contact power supply system, according to the embodiment of the invention.

Then, with reference to FIGS. 10 to 13, the result of measuring the radiated electromagnetic fields and the transmission efficiencies in the resonance-type non-contact power supply system 10 of the present embodiment and the related-art resonance-type non-contact power supply system 510 is described. FIG. 10 shows the system configuration of a measurement system corresponding to the related-art resonance-type non-contact power supply system 510, and FIG. 11 shows a result of measuring the electromagnetic field strength (electric field and radiated electromagnetic field). Similarly, FIG. 12 shows the system configuration of a measurement system corresponding to the resonance-type non-contact power supply system 10 of the present embodiment, and FIG. 13 shows a result of measuring the electromagnetic field strength (electric field and radiated electromagnetic field).

Summaries of the system configurations of the measurement systems of FIGS. 10 and 12 are as follows.

(1) High frequency power supply 20:
the frequency is 13.56 MHZ (+−1 MHz), and the output power is 3 kW.

(2) The coaxial cable 1 (the power-transmission-side coaxial cable 60):
a coaxial cable (3 m) is used as a high frequency electric power transmission line and connects the high frequency power supply 20 and the loop coil (the primary coil 30), and
there are 5 electromagnetic field measurement spots (spaced 50 cm).

(3) The coaxial cable 2 (the power-receiving-side coaxial cable 70):
a coaxial cable (2 m) is used as a high frequency electric power transmission line and connects the power-receiving-side loop coil (the secondary coil 40) and the attenuator (load).

(4) The loop coils (30, 40):
the loop coils 30, 40 are made of copper, have a diameter of 150 mm, and are made of copper wires of 5 mm in diameter, and the power-transmission-side construction is the same as the power-receiving-side construction.

(5) The resonance coils (35, 45):
the resonance coils are made of copper, have a diameter of 300 mm, an inside diameter of 185 mm and a pitch of 5 mm, and are spiral coils made of copper wires of 5 mm in diameter, the power-transmission-side construction is the same as the power-receiving-side construction, and the distance between the coils is 200 mm.

(6) The metal cases (the power-transmission-side and power-receiving-side metal shields 80, 90) <only for the present embodiment (FIG. 12)>:
the metal cases are connected to the coaxial cable outer conductors 64, 74 of the power-transmission-side and the power-receiving-side coaxial cables 60, 70 to cover the loop coils (30, 40) and the resonance coils (35, 45).

(7) The load device 50:
the power-receiving-side high frequency electric power is attenuated a given quantity by the attenuator, and a signal level is measured with a spectrum analyzer.

An outline of the measurement conditions is as follows.

The resonance-type non-contact power supply system 10 of the present embodiment in which the metal cases are used was measured by the measurement system shown in FIG. 12. In contrast, the related-art resonance-type non-contact power supply system 510 in which the metal cases were not used was measured by the measurement system shown in FIG. 10.

Electromagnetic field sensors were installed at measurement points. The vertical distance from the measurement point to the electromagnetic field sensor surface was 50 mm.

Electric power of a frequency of 13.56 MHz and 3 KW was output from the high frequency power supply 20, and the maximum electric field values and the maximum magnetic field values measured by the electromagnetic field sensors were acquired.

<Measurement in a Reference State (Direct Connection)>
The coaxial cable 1 (the power-transmission-side coaxial cable 60) and the coaxial cable 2 (the power-receiving-side coaxial cable 70) were directly connected.

Electric power of a frequency of 13.56 MHz and 3 kW was output from the high frequency power supply 20.

The electric power that arrived at the power-receiving-side load device 50 was measured with a spectrum analyzer. This electric power was assumed as A (100%).

The output of the high frequency power supply 20 was stopped after the measurement in a direct connection state.

<Measurement of the Construction without the Metal Cases>

The power-transmission-side coils (30, 35) were connected to the coaxial cable 1 (the power-transmission-side coaxial cable 60) and the power-receiving-side coils (40, 45) were connected to the coaxial cable 2 (the power-receiving-side coaxial cable 70). The resonance-type non-contact power supply system 510 was constructed as shown in FIG. 10.

Electric power of a frequency of 13.56 MHz and 3 kW was output from the high frequency power supply 20.

The electric power that arrived at the power-receiving-side load device 50 was measured with a spectrum analyzer. This electric power was assumed as B1.

The transmission efficiency (%) between coils was calculated by the following formula 1.

$$(B1/A)*100 \quad \text{formula (1)}$$

<Measurement of the Construction With the Metal Cases>

The power-transmission-side coils (30, 35) were connected to the coaxial cable 1 (the power-transmission-side coaxial cable 60) and the power-receiving-side coils (40, 45) were connected to the coaxial cable 2 (the power-receiving-side coaxial cable 70). The resonance-type non-contact power supply system 10 was constructed as shown in FIG. 12 by adding the metal cases (the power-transmission-side and power-receiving-side metal shields 80, 90).

Electric power of a frequency of 13.56 MHz and 3 kW was output from the high frequency power supply.

The electric power that arrived at the power-receiving-side load device 50 was measured with a spectrum analyzer. This electric power was assumed as B2.

The transmission efficiency (%) between coils was calculated by the following formula 2.

$$(B2/A)*100 \quad \text{formula (2)}$$

The results of the measurements are as follows. As shown in FIG. 11, for the related-art resonance-type non-contact power supply system 510, the power-transmission-side electric field X over the whole power-transmission-side coaxial cable 60 was measured to have high values more than 2,500V/m. Further, the magnetic field near the primary coil 30 was measured to have a value of around 2.0 A/m. The power-receiving-side Y electric field near the secondary coil 40 was measured to have a high value more than 2,500V/m. The electric power transmission efficiency between the coils was 89%.

On the other hand, the measurement result of the resonance-type non-contact power supply system 10 of the present embodiment is shown in FIG. 13. In particular, it can be recognized that the high electromagnetic field at the power transmission side X was greatly reduced. The electric fields both at the power transmission side X and at the power receiving side Y became values near zero. The electric power transmission efficiency between the coils was 96%, and a 7% improvement in comparison with the related art was obtained.

The present invention is described based on the embodiments as above. The above embodiments are illustrative and it is understood by those skilled in the art that it is possible to make various modifications to those components and their combination and that these modifications are also in the scope of the invention. For example, the primary resonance coil 35 and the secondary resonance coil 45 are loop power-supply type (indirect type) ones for which the primary coil 30 and the secondary coil 40 are used, but the primary resonance coil 35 and the secondary resonance coil 45 may be direct charging type ones.

Although the invention is described in detail with reference to specific embodiments, it is apparent that various modifications and amendments may be made by those skilled in the art without departing from the spirit and scope of the invention.

The present invention is useful in the field of resonance-type non-contact power supply systems.

What is claimed is:

1. A resonance-type non-contact power supply system which comprises a power-transmission-side resonance coil part and a power-receiving-side resonance coil part, and which transmits electric power by a non-contact resonance effect from the power-transmission-side resonance coil part to the power-receiving-side resonance coil part, the system further comprising:
    a first coaxial cable which electrically connects a high frequency power supply and the power-transmission-side resonance coil, and
    a power-transmission-side shield part which is a conductor and covers from outside to accommodate the power-transmission-side resonance coil part, and which is electrically connected to a housing of the high frequency power supply by an outer conductor of the first coaxial cable, wherein
    a size of the power-transmission-side shield part is set so that an electromagnetic coupling of the power-transmission-side resonance coil part is not affected,
    the power-transmission-side shield part accommodates the power-transmission-side resonance coil part not to protrude from the power-transmission-side shield part,
    a first transmission opening is provided on a bottom of the power-transmission-side shield part and the outer conductor of the first coaxial cable is connected to an inner edge of the first transmission opening, and
    the power-transmission-side shield part comprises a first cover body which has such a material and such a construction that an electromagnetic coupling of the power-receiving-side resonance coil part is not affected.

2. The resonance-type non-contact power supply system according to claim 1, further comprising:
    a second coaxial cable which electrically connects the power-receiving-side resonance coil part and a load device, and
    a power-receiving-side shield part which is a conductor and covers from outside to accommodate the power-receiving-side resonance coil part, and which is electrically connected to a housing of the load device by an outer conductor of the second coaxial cable, and wherein
    a size of the power-receiving-side shield is set so that an electromagnetic coupling of the power-receiving-side resonance coil part is not affected,
    the power-receiving-side shield part accommodates the power-receiving-side resonance coil part not to protrude from the power-receiving-side shield part, and
    a second transmission opening is provided on a bottom of the power-receiving-side shield part and the outer conductor of the second coaxial cable is connected to an inner edge of the second transmission opening.

3. The resonance-type non-contact power supply system according to claim 2, wherein the power-receiving-side shield part comprises a second cover body which has such a material and such a construction that the electromagnetic coupling of the power-transmission-side resonance coil part is not affected.

4. A resonance-type non-contact power supply system which comprises a power-transmission-side resonance coil part and a power-receiving-side resonance coil part, and which transmits electric power by a non-contact resonance effect from the power-transmission-side resonance coil part to the power-receiving-side resonance coil part, the system further comprising:
    a second coaxial cable which electrically connects the power-receiving-side resonance coil part and a load device; and
    a power-receiving-side shield part which is a conductor and covers from outside to accommodate the power-receiving-side resonance coil part, and which is electrically connected to a housing of the load device by an outer conductor of the second coaxial cable, and wherein
    a size of the power-receiving-side shield is set so that an electromagnetic coupling of the power-receiving-side resonance coil part is not affected,
    the power-receiving-side shield part accommodates the power-receiving-side resonance coil part not to protrude from the power-receiving-side shield part,
    a second transmission opening is provided on a bottom of the power-receiving-side shield part and the outer conductor of the second coaxial cable is connected to an inner edge of the second transmission opening, and
    the power-receiving-side shield part comprises a second cover body which has such a material and such a construction that an electromagnetic coupling of the power-transmission-side resonance coil part is not affected.

* * * * *